United States Patent
Boutin

(10) Patent No.: US 7,418,321 B2
(45) Date of Patent: Aug. 26, 2008

(54) DIAGNOSTIC METHOD FOR AN ELECTRONIC SYSTEMS UNIT

(75) Inventor: Samuel Boutin, Magny les Hameaux (FR)

(73) Assignee: Renault S.A.S., Billancourt (FR)

( * ) Notice: Subject to any disclaimer, the term of this patent is extended or adjusted under 35 U.S.C. 154(b) by 635 days.

(21) Appl. No.: 10/539,127

(22) PCT Filed: Dec. 19, 2003

(86) PCT No.: PCT/FR03/03850

§ 371 (c)(1),
(2), (4) Date: Jun. 16, 2005

(87) PCT Pub. No.: WO2004/059519

PCT Pub. Date: Jul. 15, 2004

(65) Prior Publication Data

US 2006/0136155 A1    Jun. 22, 2006

(30) Foreign Application Priority Data

Dec. 20, 2002  (FR) ................................ 02 16356

(51) Int. Cl.
*G06F 17/18* (2006.01)
*G05B 9/02* (2006.01)
*G06F 19/00* (2006.01)

(52) U.S. Cl. ........................... 701/29; 701/33; 701/35; 702/59; 714/25

(58) Field of Classification Search .................. 701/29, 701/33, 34, 35, 1; 702/59, 185; 714/25; 307/10.1
See application file for complete search history.

(56) References Cited

U.S. PATENT DOCUMENTS

| 7,246,039 | B2 * | 7/2007 | Moorhouse ................. 702/185 |
| 2002/0183971 | A1 * | 12/2002 | Wegerich et al. ............ 702/185 |
| 2003/0137194 | A1 * | 7/2003 | White et al. ................ 307/10.1 |
| 2005/0038632 | A1 |  2/2005 | Boutin et al. |

FOREIGN PATENT DOCUMENTS

| FR | 2 775 806 | 9/1999 |
| FR | 2 833 353 | 6/2003 |

OTHER PUBLICATIONS

CH. Scheidler et al.: "Systems Engineering for Time Triggered Architectures Deliverable D7.3 Final Document Version 1.0", The Setta Consortium, pp. 1-76, Apr. 18, 2002. XP-002264808.

(Continued)

*Primary Examiner*—Tan Q Nguyen
(74) *Attorney, Agent, or Firm*—Oblon, Spivak, McClelland, Maier & Neustadt, P.C.

(57) ABSTRACT

A diagnostic method for the default operation of an electronic systems unit, including components producing and using data, at least one datum of which can take a pre-determined fixed value, after occurrence of an erroneous functioning of at least one of the components of the unit. The method classifies, during a design phase of the architecture of the systems, the particular values following the corresponding fault and records the classification in a computer memory, for example in a form of a consultation table.

12 Claims, 2 Drawing Sheets

OTHER PUBLICATIONS

Guenther Bauer et al.: "Assumption Coverage under Different Failure Modes in the Time-Triggered Architecture", ETFA 2001. 8th International Conference on Emerging Technologies and Factory Automation, IEEE, vol. 1, pp. 333-341, 2001. XP-002264809, month is not available.

"Integrating Functional Design and Safety Analysis" SETTA, 'Online!, pp. 1-4, Jan. 21, 2002. XP-002264810.

Franz Huber et al: "Model-based development of embedded systems", Proceedings of Embedded Inteligence, pp. 1-10, Feb. 2002. XP-002264811.

C. Scheidler et al.: "Systems engineering of time-triggered architectures- The Setta Approach", 16th Int. Workshop on Distributed Conteol Systems, 'Online!, pp. 1-6, Nov. 2000. XP-002264812

Jean-Pierre Elloy et al.: "An Architecture Description Language For In-vehicle Embedded System Development", IFAC 15th World Congress B' 02, "Online!, pp. 1-6, Jul. 2002. XP-002264813.

U.S. Appl. No. 10/539,127, filed Jun. 16, 2005, Boutin.

U.S. Appl. No. 10/539,128, filed Jun. 16, 2005, Boutin.

* cited by examiner

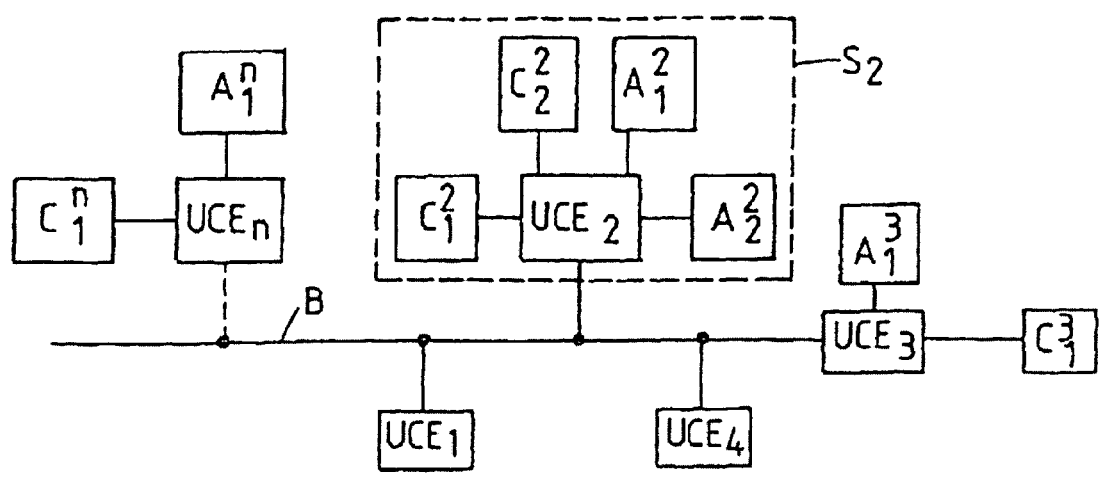
FIG.:1 (PRIOR ART)

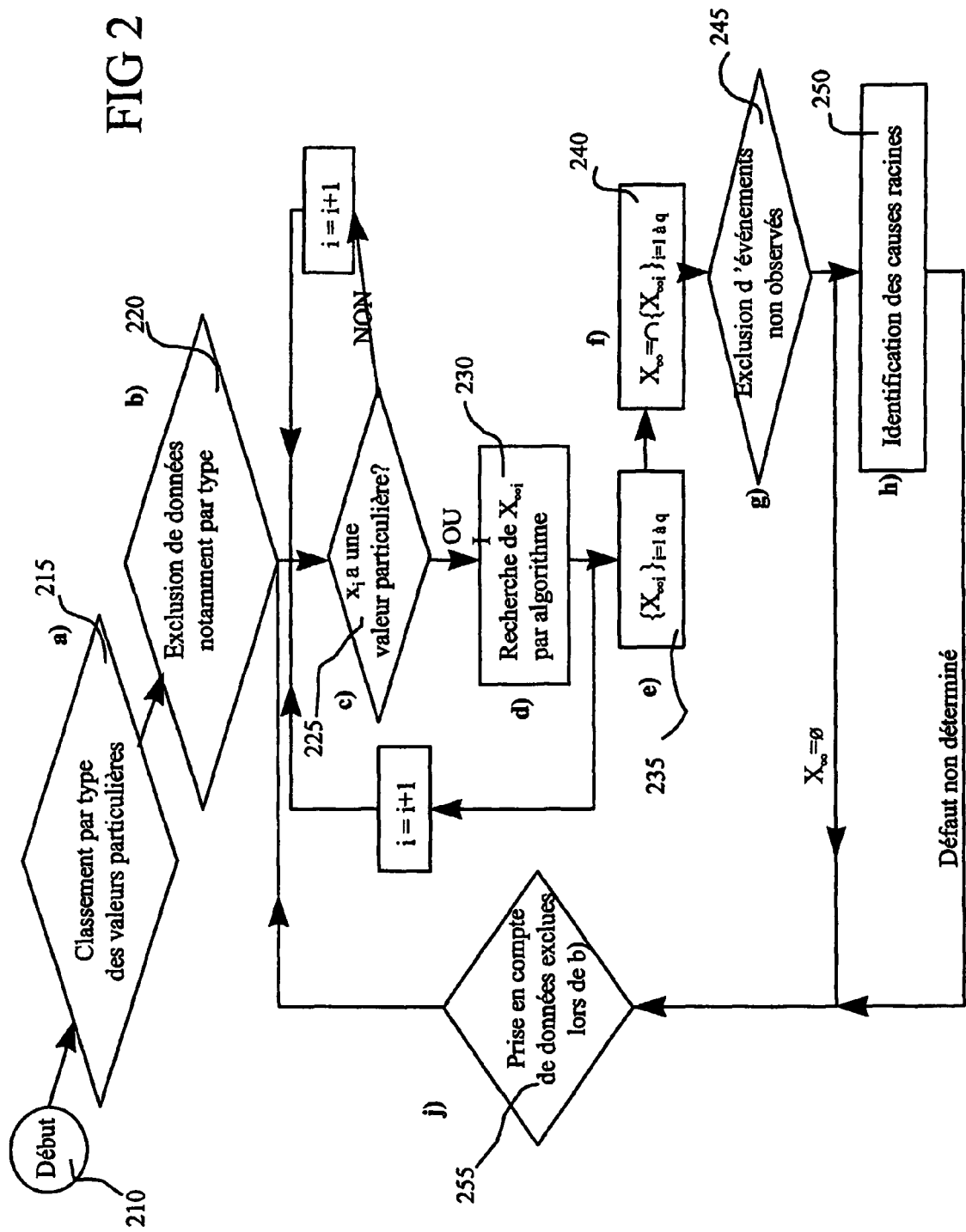

DIAGNOSTIC METHOD FOR AN ELECTRONIC SYSTEMS UNIT

The present invention relates to a method for diagnosing an assembly of electronic systems containing components ($A''_i$; $C''_i$; $UCE_n$; B) that produce and consume data, at least one of the said data ($x_i$) being able to assume a predetermined particular value ($x_{ip}$) following the development of a functional fault of at least one of the components ($A''_i$; $C''_i$; $UCE_n$; B) of the said assembly.

There are known assemblies of electronic systems of this type, designed in particular as equipment for motor vehicles. Such a vehicle is commonly provided with a plurality of systems, each ensuring the execution of a service such as control of the engine that powers the vehicle, the management of the passenger-compartment air conditioning, the management of the interactions of the vehicle with the ground (such as brakes, suspension) and the management of telephone communications.

The hardware components of the assembly of such systems, for a vehicle, for example, are illustrated schematically in FIG. 1 of the attached drawing. These components comprise substantially electronic control units or "calculators" $UCE_m$, each calculator being connected if necessary to sensors $C''_i$ and to actuators $A'''_j$, all calculators being connected to at least one and the same bus B, on which they can send or receive information streams, which may be multiplexed, for example, originating from or destined for other calculators connected to bus B.

This multiplexing is achieved in particular, as is well known for the CAN bus, for example, by introducing the information streams in question into messages having the form of digital signal frames.

As an illustrative example, "engine control" system $S_2$ comprises calculator $UCE_2$, a plurality of sensors $C^2_i$ sensitive to variables such as the speed of the engine, an internal combustion engine, for example, the pressure at the intake manifold of this engine, the outside air pressure, the temperature of the engine-cooling water, the air temperature, the battery charge level, and a plurality of actuators $A^2_j$. Calculator $UCE_2$ is duly programmed to execute a plurality of engine-control functions such as: regulation of idling speed, regulation of the richness of the air/fuel mixture, adjustment of the ignition advance of this mixture and recirculation of the exhaust gases. To accomplish this, calculator $UCE_2$ exploits the information streams arriving from the aforesaid sensors $C^2_i$ and creates control signals for actuators $A^2_j$, composed of an additional air control valve and a spark-plug ignition coil for the "idling-speed regulation" function, a fuel injector for the "richness regulator" function, the same ignition coil for the "ignition advance" function and a valve for the "recirculation of exhaust gases" function.

The other "services" cited in the foregoing, such as "passenger-compartment air conditioning" and "interaction with the ground" are executed by architecture systems analogous to that presented in the foregoing for engine control.

All these systems communicating on one and the same bus B comprise a multiplexed network. It is therefore conceivable that a plurality of functions associated with different systems can exploit information streams originating from the same sensors, for example, which avoids costly redundancies in the structure of the assembly of systems. The use of a multiplexed network also permits a very significant reduction in the length of the electric lines interconnecting the different elements of the assembly. Such a multiplexed assembly also permits the mapping of non-traditional and possibly complex functions, sometimes involving a plurality of systems and for this reason being known as "cross-functional". As an illustrative and non-limitative example, the detection of an "airbag deployed" information stream, meaning that the vehicle has suffered a collision, can then be processed in such a way that an emergency call is sent out by a mobile telephone device on board the vehicle.

From French Patent Application No. 01-15819 there is known the notion of particular value and the use thereof in a method for diagnosing functional faults of an assembly of electronic systems.

However, this method does not permit selection of a type of malfunction for the diagnosis. For example, it is not possible to search solely for malfunctions originating from the connection system, for example, or to search for the malfunctions that are primarily the most probable, since this probability is based on knowledge of the design techniques employed.

To remedy these shortcomings, the present invention relates to a method for diagnosing functional faults of an assembly of electronic systems, the said systems being composed of components ($A''_i$; $C''_i$; $UCE_n$; B) that produce and consume data, at least one of the said data ($x_i$) being able to assume a predetermined particular value ($x_{ip}$), such as, for example, a fault indication stored in a memory of a calculator, following the development of a functional fault of at least one of the components ($A''_i$; $C''_i$; $UCE_n$; B) of the said assembly, this method being characterized in that:

i) during a phase of design of the architecture of the said assembly of systems, the particular values are classified (a) according to the associated types of faults, and the said classification is recorded in a computer memory, for example in the form of a lookup table;

ii) during a diagnostic phase, a diagnostic tool is connected to the said assembly of electronic systems, the said tool having access to the said classification;

iii) the particular values corresponding to types of faults of components predefined in the said classification as particularly reliable are suppressed (b);

iv) the data ($x_i$) that have assumed a particular value ($x_{ip}$) are selected (c);

v) for each datum ($x_i$) selected in step (iv), there is automatically calculated (d) a group ($X\infty_i$) of data capable of being responsible for the particular values ($x_{ip}$) assumed by the datum ($x_i$);

vi) there is automatically established (e) a list ($X\infty$) of the data contained in the intersection of the said groups ($X\infty_i$) of data, and vii) the particular values and their propagation are recorded on a memory means for a tool provided for the diagnosis of the said assembly of electronic systems.

By virtue of this method, it is possible to search for actual or potential malfunctions according to their type, which makes it possible to shorten the malfunction-search time by considering only the most probable malfunctions. It will be understood that the term electronic system covers all electronic and electrical systems that produce and consume data.

The faults for which consequences have not been observed can be excluded (g) from the said list ($X\infty$).

This makes it possible to shorten the malfunction-search time.

If no fault remains in step (vi), it is possible to restart at step (ii), by taking into account (j) classes of fault that had been removed previously.

If a fault remains in step (vi), it is possible to verify that one of the faults identified in phase (g) is indeed the cause of the problem that led to initiation of the said diagnostic phase and, if such is not the case, step h) is recommenced.

It is possible to analyze the said list ($X\infty$) to identify that component or those components of the assembly in which a functional fault is responsible for the particular values ($x_{ip}$) assumed by the said data ($x_i$).

Fault types may belong to at least one of the categories listed below:
- the values created following the unavailability of a datum emitted by a function,
- the particular values created following the detection of a fault of a sensor or actuator,
- the particular values created following a fault of the connection system, at the level of a connector or wire,
- the particular values created following a fault of a calculator,
- the particular values created following a fault of execution of a program on a microcontroller, and
- the particular values created following a fault at the level of a communication network.

There can be automatically determined a probability that each datum will assume a particular value as a function of the category to which it belongs, and step (b) is modified by first taking step (j) into account.

By virtue of these arrangements, a malfunction search can be oriented by first taking the most probable malfunctions into account.

The said assembly of electronic systems can be composed of an assembly of systems for equipping a vehicle.

The method can include a step of analysis of the feasibility and/or susceptibility to failure of the said assembly of electronic systems and of the establishment of an output indicating the said feasibility and/or susceptibility to failure.

The present invention also provides a commercial article comprising a computer-readable memory, a program executable by a computer being recorded in the said memory for the diagnosis of functional faults of an assembly of electronic systems, characterized in that the said program includes encoding for:
i) classifying (a), during a phase of design of the architecture of the said assembly of systems, the particular values according to the associated types of faults, and the said classification is recorded in a computer memory, for example in the form of a lookup table;
ii) connecting, during a diagnostic phase, a diagnostic tool to the said assembly of electronic systems, the said tool having access to the said classification;
iii) suppressing (b) the particular values corresponding to types of faults of components predefined in the said classification as particularly reliable;
iv) selecting (c) the data ($x_i$) that have assumed a particular value ($x_{ip}$);
v) automatically calculating (d), for each datum ($x_i$) selected in step (iv), a group ($X\infty_i$) of data capable of being responsible for the particular values ($x_{ip}$) assumed by the datum ($x_i$);
vi) automatically establishing (e) a list ($X\infty$) of the data contained in the intersection of the said groups ($X\infty_i$) of data, and
vii) recording the particular values and their propagation on a memory means for a tool provided for the diagnosis of the said assembly of electronic systems.

The present invention also provides a data-processing tool programmed for the diagnosis of an assembly of electronic systems using the steps of the method of the present invention or programmed by using a commercial article of the present invention.

The said assembly of electronic systems can comprise an assembly of systems for equipping a motor vehicle.

Other objectives, characteristics and advantages of the present invention will become apparent by way of example by reading the description provided hereinafter and by examining the attached drawing, wherein:

FIG. 1 is a schematic diagram of an assembly of electronic systems that is intended to be equipped with means for diagnosing functional faults according to the present invention, this assembly being described in the preamble of the present description, and FIG. 2 is a flow diagram describing the application of the invention in a method for diagnosing malfunctions of an electronic system.

The particular values of the data produced by the components of an assembly of systems can be placed in categories, especially during the design phase, as a function of the types of faults that they manifest.

A distinction can be made between the functional particular values, which are related to the sensors, actuators and functions, and the operational particular values, which result from a particular embodiment of functions by the calculators, the data buses, the hard-wired links and the connectors.

Among the functional particular values, for an input-data flow of a function, there are recognized different categories of particular values, especially those that determine an invalid value of a datum and those that determine a value outside the definition range of the datum fixed by the designer.

Among the functional particular values, there also are recognized the particular values created following the fault of a sensor or actuator, the detection of the fault typically being achieved by a function that drives the sensor or the actuator.

Among the operational particular values, or in other words those originating from a particular implementation of functions by the calculators, the communication buses between the calculators and a cabling system, there are recognized especially:
- the particular values that diagnose a fault on a hard-wired link, especially short circuits to ground and open circuits;
- the particular values that relate to detection of a communication fault on a multiplexed bus, originating in particular from an absent data frame;
- the particular values relating to the absence of a calculator from a network; there then can be recognized the particular values produced within the isolated calculator and the particular values produced by calculators that observe the isolated calculator. This category of particular values is produced, for example, when data frames of the said network are absent, or in other words when they are expected and not received;
- the particular values relating to a fault of execution on a calculator, when it relates, for example, to a memory corruption, or in other words an accidental inversion of at least one bit in memory, detected by a CRC (Cyclic Redundancy Check) of reinitialization of the said calculator following the detection of an anomaly by a program resident on the said calculator;
- the particular values relating to a supply fault; and
- the particular values that characterize a combination of faults.

From French Patent Application No. 01-15819, filed by the Applicant and incorporated here by reference, there is known a method for diagnosing functional faults of an assembly of electronic systems that produce and consume data, at least one of the said data ($x_i$) being able to assume a predetermined particular value ($x_{ip}$) following the development of a functional fault of at least one of the components of the said assembly, this method comprising the following steps:

a) at the initiation of a diagnostic phase, there are selected the data ($x_i$) that have a particular value ($x_{ip}$), b) for each datum ($x_i$) selected in this way, there is searched the group ($X\infty_i$) of data capable of being responsible for the particular value ($x_{ip}$) assumed by the datum ($x_i$);

c) there is established the list ($X\infty$) of data belonging to the intersection of the said groups ($X\infty_i$) of data, and d) the said list ($X\infty$) is analyzed to identify that component or those components of the assembly in which a functional fault is responsible for the particular values ($x_{ip}$) assumed by the said data ($x_i$).

By implementing the present invention, the method summarized above is refined to take into account the categories of particular values of the present invention. A particular embodiment of this refined method will be described in detail with reference to FIG. 2. It contains the following steps:

an initialization step 210 of known type, a step a) 215 at the initiation of a diagnostic phase, in the course of which there are selected the data ($x_i$) that have a particular value ($x_{ip}$);

in the course of a step b) 220, there are excluded from this list the data forming part of categories judged to be more certain by the person skilled in the art; for example, only the particular values relating to faults of the connecting system are considered at first, or, if the searches have not yielded anything at this point, particular values of previously excluded categories are added;

in the course of a step c) 225, there is selected each datum ($x_i$) that has a particular value ($x_{ip}$);

in the course of a step d) 230, given the datum ($x_i$) selected in this way in step a), a search is conducted for the group ($X\infty_i$) of data capable of being responsible for the particular value ($x_{ip}$) assumed by the datum ($x_i$);

in the course of a step e) 235, there is established the list ($X\infty$) of data belonging to the intersection of the said groups ($X\infty_i$) of data;

in the course of a step f) 240, there is analyzed the said list ($X\infty$) to identify that component or those components of the assembly in which a functional fault is responsible for the particular values ($x_{ip}$) assumed by the said data ($x_i$);

in the course of a step g) 245, given the faults envisioned in step f) 240, there are excluded all the particular values corresponding to faults that have not been observed in the system, whether this has been established by the person skilled in the art after precise verification or by observation of the functioning of certain components. For example, a supply wire of a light cannot be in short-circuit if it is possible to turn the light on and off. Consequently, if a particular value characterizing the said short circuit was envisioned, it can be excluded.

a step j) 255, in the course of which, for the case that no particular value remains to be examined after step g) 245, that may mean that too many possibilities were excluded at the beginning of the analysis, and the method is reiterated starting from step c) 225, but retaining the categories of particular values excluded from the analysis up to that point;

a step h) 250, in the course of which there are examined the results of step g) 245 and, after examination, if a fault cannot be identified on the basis of the envisioned faults, the method is recommenced at step c) 225, while extending the search perimeter to new categories of particular values in the course of step j) 255.

If, for each category, there are considered probabilities of occurrence derived from empirical measurements, for example, probabilities of occurrence can be assigned to the different particular values. When a particular value covers several faults that may originate from different categories, it inherits the sum of the probabilities of occurrence of each of the faults.

The method described in the foregoing is then recommenced as a function of the probabilities of occurrence of the different categories of particular values. For example, first the most probable elements are added to the list, then if step b) is reproduced, elements slightly less probable are added to the list, and so on until there remains at least one particular value at the end of step h) and/or until the cause of the fault that necessitated the diagnosis is detected.

The assembly of electronic systems can contain an assembly of systems for equipping a motor vehicle. The method of the invention can include a step of analysis of the feasibility and/or susceptibility to failure of the said assembly of electronic systems and a step of the establishment of an output indicating the said feasibility and/or susceptibility to failure. This can aid in the acceptance or rejection of an assembly of systems, such as one proposed for a vehicle.

This method can be implemented by means of a data-processing tool making it possible to edit the different objects necessary to the design and partial automation of the different steps of the method established by the invention.

The method of the invention can be programmed on a commercial article provided with a computer-readable memory, such as a CD, DVD or equivalent, or on the hard disk of a computer. Such a program for the method will be executable by a computer and will be recorded on the said memory for execution by the said computer.

The invention claimed is:

1. A method for diagnosing functional faults of an assembly of electronic systems, the systems being composed of components that produce and consume data, at least one of the data configured to assume a predetermined particular value following development of a functional fault of at least one of the components of the assembly, the method comprising:

i) classifying, during a phase of design of architecture of the assembly of systems, the particular values according to associated types of faults, and the classification being recorded in a computer memory;

ii) connecting, during a diagnostic phase, a diagnostic tool to the assembly of electronic systems, the tool having access to the classification;

iii) suppressing the particular values corresponding to types of faults of components predefined in the classification as particularly reliable;

iv) selecting data that have assumed a particular value;

v) automatically calculating, for each datum selected in the selecting, a group of data configured to be responsible for the particular values assumed by the datum;

vi) automatically establishing a list of the data contained in an intersection of the groups of data; and vii) recording the particular values and their propagation on a memory for a tool provided for diagnosis of the assembly of electronic systems.

2. A method according to claim 1, wherein faults for which consequences have not been observed are excluded from the list.

3. A method according to claim 1, wherein, if no fault remains in the automatically establishing (vi), the method is restarted at the connecting (ii), by taking into account classes of fault that had been removed previously.

4. A method according to claim 3, wherein, if a fault remains in the automatically establishing (vi), it is verified that one of the faults identified is the cause of the problem that led to initiation of the diagnostic phase and, if such is not the case, the connecting (ii) is recommenced.

5. A method according to claim 1, wherein the list is analyzed to identify that component or those components of the assembly in which a functional fault is responsible for the particular values assumed by the data.

6. A method according to claim 1, wherein fault types belong to at least one of categories listed below:
- values created following unavailability of a datum emitted by a function,
- particular values created following detection of a fault of a sensor or actuator,
- particular values created following a fault of the connection system, at a level of a connector or wire,
- particular values created following a fault of a calculator,
- particular values created following a fault of execution of a program on a microcontroller, and
- particular values created following a fault at the level of a communication network.

7. A diagnostic method according to claim 1, wherein there is automatically determined a probability that each datum will assume a particular value as a function of the category to which it belongs, and wherein the suppressing (iii) is modified by first taking into account classes of faults that had been removed previously.

8. A diagnostic method according to claim 1, wherein the assembly of electronic systems is composed of an assembly of systems for equipping a vehicle.

9. A diagnostic method according to claim 1, further comprising analysis of feasibility and/or susceptibility to failure of the assembly of electronic systems and of establishment of an output indicating the feasibility and/or susceptibility to failure.

10. A data-processing tool programmed for the diagnosis of an assembly of electronic systems using the method according to claim 1.

11. A commercial article provided with a computer-readable memory, program executable by a computer being recorded in the memory for diagnosis of functional faults of an assembly of electronic systems, the program including encoding for:
  i) classifying, during a phase of design of architecture of the assembly of systems, particular values according to associated types of faults, and the classification is recorded in a computer memory;
  ii) connecting, during a diagnostic phase, a diagnostic tool to the assembly of electronic systems, the tool having access to the classification;
  iii) suppressing the particular values corresponding to types of faults of components predefined in the classification as particularly reliable;
  iv) selecting the data that have assumed a particular value;
  v) automatically calculating, for each datum selected in an selecting (iv), a group of data configured to be responsible for the particular values assumed by the datum;
  vi) automatically establishing a list of the data contained in an intersection of the groups of data, and
  vii) recording the particular values and their propagation on a memory for a tool provided for the diagnosis of the assembly of electronic systems.

12. A data-processing tool programmed for the diagnosis of an assembly of electronic systems using the commercial article according to claim 11.

* * * * *